United States Patent
Hunter

(10) Patent No.: US 11,015,132 B2
(45) Date of Patent: May 25, 2021

(54) HIGH CONVERSION HYDROCRACKING PROCESS

(71) Applicant: HALDOR TOPSØE A/S, Kgs. Lyngby (DK)

(72) Inventor: Michael Glenn Hunter, Orange, CA (US)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 0 days.

(21) Appl. No.: 16/320,421

(22) PCT Filed: Aug. 1, 2017

(86) PCT No.: PCT/EP2017/069445
§ 371 (c)(1),
(2) Date: Jan. 24, 2019

(87) PCT Pub. No.: WO2018/033381
PCT Pub. Date: Feb. 22, 2018

(65) Prior Publication Data
US 2020/0172818 A1 Jun. 4, 2020

Related U.S. Application Data

(60) Provisional application No. 62/376,812, filed on Aug. 18, 2016, provisional application No. 62/469,107, filed on Mar. 9, 2017.

(30) Foreign Application Priority Data

Sep. 5, 2016 (DK) .......................... PA 2016 00514

(51) Int. Cl.
*C10G 67/14* (2006.01)
*B01D 3/14* (2006.01)
*B01D 3/38* (2006.01)

(52) U.S. Cl.
CPC ............. *C10G 67/14* (2013.01); *B01D 3/141* (2013.01); *B01D 3/38* (2013.01); *C10G 2300/4012* (2013.01); *C10G 2300/4081* (2013.01)

(58) Field of Classification Search
CPC ........... C10G 67/14; C10G 2300/4012; C10G 2300/4081; B01D 3/38; B01D 3/141
See application file for complete search history.

(56) References Cited

U.S. PATENT DOCUMENTS 4,058,449 A 11/1977 Reitz et al.
4,950,384 A 8/1990 Groeneveld et al.
(Continued)

FOREIGN PATENT DOCUMENTS

| CN | 104114679 A | 10/2014 |
| WO | 2013019624 A1 | 2/2013 |

(Continued)

OTHER PUBLICATIONS

Sinnott, R.K. (2005) Chemical Engineering Design, 4th edition, Elsevier, 1038 pgs [Office action cites Table 10.1 on p. 402].*

(Continued)

*Primary Examiner* — Brian A McCaig
(74) *Attorney, Agent, or Firm* — Buchanan Ingersoll & Rooney P.C.

(57) ABSTRACT

A process including (a) directing a hydrocarbon mixture to contact a material catalytically active in hydrocracking under hydrocracking conditions, (b) providing a first hydrocracked product, (c) directing an amount of the first hydrocracked product and an amount of a converted hydrocracked product to a product separation step separating it into one or more products and a recycle oil having a higher boiling point than the products, (d) directing the recycle oil to contact a second material catalytically active in hydrocracking under (Continued)

hydrocracking conditions providing a second hydrocracked product, (e) directing at least an amount of the second hydrocracked product as feed to a second separation step, separating the second hydrocracked product in at least two fractions, a converted hydrocracked product and an unconverted oil an unconverted oil having a higher average boiling point than the recycle oil, (f) withdrawing at least an amount of the unconverted oil as purge.

20 Claims, 4 Drawing Sheets

(56) References Cited

U.S. PATENT DOCUMENTS

| | | | | |
|---|---|---|---|---|
| 5,232,578 | A * | 8/1993 | Gillespie | C10G 65/10 208/111.15 |
| 6,379,532 | B1 * | 4/2002 | Hoehn | C10G 65/12 208/58 |
| 2003/0047486 | A1 | 3/2003 | Cash et al. | |
| 2011/0203969 | A1 | 8/2011 | Ramaseshan | |
| 2012/0031811 | A1 | 2/2012 | Cowan et al. | |
| 2013/0098802 | A1 | 4/2013 | Koseoglu et al. | |
| 2014/0262941 | A1 * | 9/2014 | Ramaseshan | B01D 3/141 208/58 |

FOREIGN PATENT DOCUMENTS

| | | |
|---|---|---|
| WO | 2015128037 A1 | 9/2015 |
| WO | 2015128039 A1 | 9/2015 |

OTHER PUBLICATIONS

Office Action dated Jan. 22, 2020, by the Chilean Patent Office (INAPI) in corresponding Chilean Patent Application No. 201900414, and an English Translation of the Office Action. (23 pages).

Office Action (The First Office Action) dated Apr. 15, 2020, by the State Intellectual Property Office of the People's Republic of China in corresponding Chinese Patent Application No. 201780039461.1 and an English Translation of the Office Action. (12 pages).

Danish Search Report for Danish PA 2016 00514 dated Mar. 6, 2017 (9 pages).

International Search Report (PCT/ISA/210) dated Oct. 13, 2017, by the European Patent Office as the International Searching Authority for International Application No. PCT/EP2017/069445.

Written Opinion (PCT/ISA/237) dated Oct. 13, 2017, by the European Patent Office as the International Searching Authority for International Application No. PCT/EP2017/069445.

* cited by examiner

HIGH CONVERSION HYDROCRACKING PROCESS

The invention relates to a process for hydrocracking a hydrocarbon feedstock to obtain lower boiling products such as middle distillate which may be more valuable than the feedstock. In particular, the invention concerns a process whereby the build-up of heavy poly-nuclear aromatic (HPNA) compounds is minimized and which separates these in concentrated form in a portion of the unconverted oil so they can be removed, resulting in high conversion and yield of products.

Hydrocracking is the process converting large hydrocarbon molecules to lower molecular weight products. This makes it possible to convert heavy feeds into commercially attractive fuels. The complete conversion of petroleum or synthetic heavy gas oils to distillate products such as gasoline, jet and diesel fuel in a hydrocracker is practically limited by the formation of heavy poly-nuclear aromatic (HPNA) compounds, which have limited solubility in the product stream and have a strong tendency toward deactivation of the catalysts employed. The conventional solution to this problem is to utilize high hydrogen partial pressure to limit the rate of formation of HPNA and then to remove a portion of the recycle oil stream as an unconverted oil stream to purge the HPNA compounds and precursors from the system, effectively balancing the HPNA purge rate with the rate of their formation by reactions. This approach limits the total conversion level achievable in the hydrocracker.

Now, according to the present invention the build-up of HPNA compounds is avoided by minimizing the recycle of such formed compounds. This is realized by a two stage hydrocracker, having a main fractionation section receiving the first and second stage product and a final separation section, typically a stripper, receiving only the second stage product. Thereby the final separation section only receives a limited volume, and may be configured for efficient removal of unwanted heavy products. It may be preferable to operate one or both hydrocracking stages at high conversion, before fractionating the products into one or more light fractions since this will limit the volume directed to the final separation section further. If the $2^{nd}$ stage hydrocracked stream is then separated at high temperature and/or stripped, the separation efficiency may be increased even further, resulting in minimal purge of unconverted oil while recycling a minimal amount of HPNA vapor.

Definitions

The term unconverted oil shall in accordance with the terminology of the field denote a fraction of the product boiling in the same range as the feedstock. Unconverted thus refers to the observed boiling point and not to whether the molecular structure of the constituents have changed in the process.

The terms heavy and light hydrocarbons are included only as relative and descriptive terms, and shall not be construed to exclude specific fractions, unless indicated e.g. by boiling point ranges.

The term bubble point shall in accordance with the terminology of the field be considered as the temperature, for a given pressure, at which bubbles of gas are first formed in a hydrocarbon mixture.

Where boiling point is stated, it may either be initial boiling point or specific % boiling point, in accordance with the definitions of ASTM D86. Average boiling point shall be understood as volumetric average boiling point in accordance with the use in the refinery art, e.g. in American Petroleum Institute's Technical Data Book.

The term hydrocracking shall in accordance with the terminology of the field be considered as the process of catalytically converting a high boiling, high molecular weight hydrocarbonaceous oil under conditions of elevated hydrogen pressure and at high temperatures into lower boiling range, lower molecular weight products. Hydrocracking takes place under a wide range of conditions. The pressure may be from 10 to 160 bar in an atmosphere rich in hydrogen, typically from 80% to 100%. The temperature may be from 280° to 450° C. The materials catalytically active in hydrocracking are active for both the cracking of carbon-carbon bonds and the hydrogenation of unsaturated molecules present in the feed and products. Such material catalytically active in hydrocracking typically comprises an acidic refractory support often mixed with a carrier matrix and either noble elemental metal from IUPAC group 8, 9 or 10, typically Pt or Pd, or a sulfided metal from IUPAC group 6, often promoted by a further sulfided metal from IUPAC group 8, 9 or 10, typically Mo or W in combination with Ni or Co.

The term hydrocracking conversion shall in accordance with the terminology of the field be considered as the mass of product hydrocarbon boiling below a defined limit, divided by the amount of feedstock. As known to the skilled person, the conversion in a process may be defined by the nature of the material catalytically active in hydrocracking used, the amount used, the space velocity in the reactor and the temperature of the catalytically active material.

The term stripper shall in accordance with the terminology of the field be considered as a countercurrent multi-stage separation device utilizing an external stripping medium such as steam or gas supplied at the bottom of the tower to facilitate the separation of a feed stream into a lighter lower molecular weight product recovered at the top of the tower and a heavier higher molecular weight product recovered at the bottom of the tower. Typically steam will have a lower temperature than the feed stream to be separated, and thus the light and heavy streams leaving the stripper will have a lower temperature than the feed stream.

A fractionator shall in accordance with the terminology of the field be considered as a countercurrent multi-stage separation device utilized to separate at least two, but commonly three or more product fractions based on boiling range and relative volatility. The degree of separation in the tower is determined by the combination of reflux rates and number of equilibrium stages employed. External heat is typically applied to the feed stream or the bottom of the tower or to intermediate flows within the tower for purpose of generating the desired reflux flows. A fractionator may in addition be fed a stream of steam or other stripping medium to support separation.

A gas/liquid separator shall in accordance with the terminology of the field be considered as a vessel which receives a feed stream consisting of a vapor phase and a liquid phase provides sufficient volumetric holding time for the phases to separate by gravity force and then be separately removed from the vessel in two or more product streams. Commonly a separation section comprising several gas/liquid separators may be configured for separation at different pressure and temperature levels, which may provide more efficient separation and/or higher thermal efficiency.

A trickle bed reactor or a trickle bed hydrocracker shall in accordance with the terminology of the field be considered as a vessel in which one or more beds of stationary solid catalytically active material, typically in pellet form, are contacted by a liquid stream and a gaseous stream.

The term fluid communication shall be construed as any substantial unhindered connection between two process elements, including but not limited to the connection via tubes, via the same side of heat exchangers, but excluding the connection through a reactor containing catalytically active material.

The present disclosure relates in a broad form to a process for conversion of a hydrocarbon mixture of which at least 95% has a boiling point above 150° C. to a lower boiling hydrocarbon product comprising the steps of
(a) directing said hydrocarbon mixture to contact a material catalytically active in hydrocracking under hydrocracking conditions
(b) providing a first hydrocracked product
(c) directing at least an amount of said first hydrocracked product and an amount of a converted hydrocracked product to a product separation step separating it into one or more products and a recycle oil having a higher average boiling point than said products
(d) directing said recycle oil to contact a second material catalytically active in hydrocracking under hydrocracking conditions providing a second hydrocracked product
(e) directing at least an amount of said second hydrocracked product as feed to a second separation step, separating said second hydrocracked product in at least two fractions, a converted hydrocracked product and an unconverted oil having a higher average boiling point than said recycle oil
(f) and withdrawing at least an amount of said unconverted oil as purge,
with the associated benefit of such a process ensuring that the separation efficiency for separating the second hydrocracked product in the second separation step is high, such that a minimal amount of HPNA is directed to the product separation step and that HPNA is rejected to ensure that buildup of HPNA is minimized. The feed to the product separation step may be one combined separation section feed stream or a plurality of individual separation section feed streams.

In a further embodiment said second separation step receives thermal energy from at least one heat source, for heating at least one inlet stream to a means of separation partaking in said second separation step or one internal stream of said second separation step to a temperature 5° C., 20° C. or 50° C. above the bubble point of said inlet stream or said internal stream, with the associated benefit of providing heat to said second separation step of ensure a highly effective separation of vapor from unconverted oil. For products dominated by diesel this temperature would typically be above 350° C., 380° C. or 400° C. and for products dominated by naphtha this temperature would typically be above 260° C., 280° C. or 300° C.

In a further embodiment said second separation step involves gas/liquid separation in one or more steps, an optional intermediate separation step, and a final step of separation, said optional intermediate separation step, if present, receiving at least an amount of the liquid from said gas/liquid separation steps and providing a heavy fraction of said liquid from said gas/liquid separation steps to said final step of separation, or if said intermediate separation step is not present; said final step of separation receiving at least a fraction of the liquid from said gas/liquid separation steps and wherein said thermal energy is directed to an inlet stream to said final step of separation, with the associated benefit of said final step of separation operating at high efficiency, while requiring only a limited stream to be heated.

In a further embodiment said second separation step involves one or more intermediate separation steps, receiving the liquid fraction from said gas/liquid steps and directing a light fraction to said product separation step and directing a heavy fraction to said final step of separation, with the associated benefit of limiting the amount of material to be heated and separated in said final step of separation further.

In a further embodiment said final step of separation is a stripping step receiving a liquid fraction, a stripping medium and optionally a recycle of liquid, and in which said thermal energy is directed to one or more of said liquid fraction, said stripping medium and said optional recycle of liquid, with the associated benefit of a stripping step being highly efficient in releasing vapor from a small amount of heavy unconverted oil.

In a further embodiment all steam required for the operation of said product separation step is directed to said stripping step and in which said stripping medium is steam at pressure level consistent with the operation of said product separation step, with the associated benefit of efficient utilization of the stripping steam. Typically a steam pressure level consistent with a product separation step will be 3 to 10 barg, as this matches the normal pressure levels typically encountered in the hydrocracker product recovery section.

In a further embodiment said final step of separation is a fractionator receiving a liquid fraction, optionally a stream of steam and optionally a recycle of liquid, and in which said thermal energy is directed to one or more of said liquid fraction, said optional stream of steam and said optional recycle of liquid or in the form of reboiling the heavy bottoms with the associated benefit of a fractionator being a simple and effective means of separation, which may also be configured for operation at sub-atmospheric pressure.

In a further embodiment said final step of separation receives a stream having a mass flow less than 25%, 10% or 5% of the mass flow of the hydrocarbon mixture, with the associated benefit of such a process being cost effective, due to the small size of said final step of separation, while having a minimal purge of unconverted oil. As known to the skilled person, this may be obtained by appropriate control and configuration of the separator conditions upstream the final step of separation, as well as by the process conditions defining the conversion in the first material catalytically active in hydrocracking and the process conditions defining the conversion in the second material catalytically active in hydrocracking.

In a further embodiment at least 50%, 70% or 80% of said first hydrocracked product boils below the initial boiling point of said heavy hydrocarbon mixture, and at least 50%, 70% or 80% of said second hydrocracked product boils below the initial boiling point of said recycle oil, with the associated benefit that such aggressive operation of the two hydrocracker stages limits the amount of unconverted oil being directed to the final separation step, and thus it enables efficient operation of the final separation step.

In a further embodiment said process operates at a pressure below 140 bar or below 120 bar, with the associated benefit of such a low pressure, compared to the normal pressures above 160 bar being related to a significant saving in capital cost and operational cost of the hydrocracker.

In a further embodiment no stream of first hydrocracked product is directed to said second separation step without having first contacted a second catalytically active material, with the associated benefit of said second hydrocracked product is not diluted, ensuring a simple separation of a stream rich in HPNA from the second hydrocracked product.

In a further embodiment the feed temperature of the second hydrocracked product to the second separation step is at least 320° C., 350° C. or 380° C., with the associated benefit of maintaining a high temperature level in the second separation step, such that the final stripping of the second hydrocracked product liquid outlet stream may effectively separate HPNA from lighter fractions of the product.

A further aspect of the present disclosure relates to a hydrocracking process plant comprising a first stage trickle bed hydrocracker having an inlet and an outlet, a second stage trickle bed hydrocracker having an inlet and an outlet, a product separation section having at least one inlet and at least a light fraction outlet and a heavy fraction outlet, a second separation section having an inlet and at least a light fraction outlet and a heavy fraction outlet, in which said first stage hydrocracker inlet is in fluid communication with a feed stream, and said first stage hydrocracker outlet is in fluid communication with the inlet of said product separation section, in which said product separation section bottom fraction outlet is in fluid communication with the second hydrocracker inlet, optionally via a common fractionator, the second hydrocracker outlet is in fluid communication with said second separation section inlet, said second separation section light fraction outlet is in fluid communication with one inlet of said product separation section and said second separation section heavy fraction outlet is in fluid communication with an unconverted oil purge line, wherein there is no fluid communication between said first stage hydrocracker outlet or said product separation section outlet and the second separation section inlet, with the associated benefit of such a process plant layout supporting that heavy product comprising HPNA is substantially withdrawn as purge and not recycled.

In a further embodiment said second stage product separation stage comprises a liquid/vapor separation section having an inlet, a vapor outlet and a liquid outlet, said second stage product separation stage optionally comprising a high pressure hot separator and a low pressure hot separator configured for the liquid outlet of said high pressure hot separator being in fluid communication with the feed stream inlet of said low pressure hot separator, and for the liquid outlet from said low pressure hot separator being in fluid communication with the second stage hydrocracker separation section liquid outlet, and a stripping section, said stripping section optionally comprising a first second stage means of separation such as a stripper or a fractionator and a second second stage means of separation such as a stripper or a fractionator each having, a feed stream inlet, a vapor outlet and a liquid outlet and optionally a stripping medium inlet, wherein said first second stage means of separation inlet is in fluid communication with the liquid/vapor separation section liquid outlet and the first second stage means of separation optionally is receiving medium pressure steam as stripping medium, and wherein the first second stage means of separation liquid outlet is in fluid communication with the inlet of the second second stage means of separation which optionally is further receiving low pressure steam as stripping medium, and wherein the vapor outlet of said first second stage means of separation is in fluid communication with a feed stream inlet of said product separation section and the vapor outlet of said second second stage stripper is in fluid communication with a feed stream inlet of said product separation section, with the associated benefit of such a process operating the stripping process in two stages, which has the benefit of withdrawing gas prior to the fractionation section and prior to mixing with the product of the first hydrocracking step.

In a further embodiment the second stage stripper is integrated into the main product fractionation tower by means of a divided wall tray arrangement with the associated benefit of eliminating a separate stripping tower vessel with corresponding savings in equipment cost.

Hydrocracking is the process of converting large hydrocarbon molecules to, lower molecular weight products. This makes it possible to convert heavy feeds into commercially attractive fuels. The complete conversion of heavy hydrocarbonaceous feeds, especially when comprising aromatics, to distillate products such as gasoline, jet and diesel fuel in a hydrocracker is practically limited by the formation of heavy poly-nuclear aromatic (HPNA) compounds, which have limited solubility in the product stream, often below 5000 ppm. This problem may be of relevance to petroleum or synthetic heavy gas oils, as well as heavy hydrocarbon streams of other origins, such as pyrolysis or gasification oils from treatment of biological raw materials, waste and coal.

The HPNA compounds, formed by undesired side reactions during hydrocracking, are stable and virtually impossible to convert to lighter products by hydrocracking. HPNA are fused polycyclic aromatic compounds having 7+ rings for example coronenes $C_{24}H_{12}$, benzocoronenes $C_{28}H_{14}$, dibenzocoronenes $C_{32}H_{16}$ and ovalenes $C_{32}H_{14}$.

When the solubility limit for the HPNA is exceeded, solids form in transfer lines, valves and on heat exchanger surfaces. Furthermore the HPNA can contribute to catalyst deactivation by irreversible coke formation on active reaction sites. HPNA problems particularly occur when processing heavy feedstocks with high distillation endpoints and more aromatic cracked stocks in high conversion recycle units.

Consequently, if HPNA builds up to high levels in the recycle streams, this may result in deactivation of the catalysts and potential fouling of equipment.

The conventional solution to this problem is to remove a portion of the recycle oil stream as an unconverted oil stream to purge the HPNA compounds from the system, dissolved in the unconverted oil (UCO), effectively balancing the HPNA purge rate with the rate of their formation by reactions. This approach limits the total conversion level achievable in the hydrocracker, and requires purge of more UCO than desired.

In a conventional two stage hydrocracking process, a hydrocarbonaceous heavy gas oil feedstock is combined with a hydrogen-rich gas and reacted over catalyst to obtain a first stage hydrocracked effluent comprising less dense, lower molecular weight products. An unconverted oil from the product fractionation step is then combined with hydrogen rich gas and reacted over a catalyst to obtain a second stage hydrocracked effluent comprising less dense, lower molecular weight products. The hydrocracked effluent from the first and second stage reactors is typically combined and then condensed and separated in a single separation section into a liquid portion comprising primarily hydrocarbons and a vapor portion comprising primarily un-reacted hydrogen. The vapor from this separation may be combined with hydrogen makeup gas to account for hydrogen consumed by reaction and may then be compressed and re-circulated back to the reactors. The combined liquid product from the separation section is fractionated in one or more distillation steps, and a heavy unconverted fraction is recycled to increase the conversion to desired products. To avoid excessive build-up of HPNA, a side stream of the unconverted oil recycle is purged. The required amount of purge may be reduced if the HPNA in the recycle stream is concentrated in a stripper prior to purge.

According to the present disclosure it has been realized that the build-up of HPNA compounds may be avoided by a novel process layout where the recycle of formed HPNA compounds is minimized. Such a process layout is realized by operating a first hydrocracking stage at high conversion, and fractionating the product into one or more light fractions and a heavy product. The heavy product is directed to a second hydrocracker stage, providing a second hydrocracked stream. This second hydrocracked stream is then separated independently from the first stage product, typically in a series of high temperature flash and steam stripping steps, providing an overhead fraction and a heavy unconverted product. If both hydrocrackers operate at high conversion and the stripping processes operate at high temperature it is possible to reduce the amount of unconverted product withdrawn, even further.

A significant cost of hydrocracking units is related to the desire to operate the process at high pressure. One reason for this is the need to protect the catalyst from deactivation due to the presence of HPNA, by providing an elevated amount of hydrogen on the catalyst surfaces. With less HPNA it is possible to reduce the amount of hydrogen, i.e. to reduce the pressure at which the process operates from e.g. 150-180 bar to around 100-130 bar. This change in pressure significantly reduces the capital cost as the amount and quality of material is reduced. In addition the lower hydrogen pressure will also lower the hydrogen consumption in the plant, which has a positive influence on the operational cost.

Some benefits of the present process are related to the choice of a high conversion in the two hydrocracker stages. The conversion may be considered a controllable parameter, which may be adjusted—during operation mainly by the temperature and space velocity but during process design also by the amount of catalyst and the choice of catalyst. Often a moderate conversion is desired, as this will result in a low yield loss due to a low production of gases, and furthermore if PNA and HPNA is present in the recycle, high conversion will also increase the formation of HPNA. A high conversion may however also be beneficial, since this may increase yields of desired products. In some embodiments of the present scheme a high conversion is preferred, since this will reduce the amount of heavy product and unconverted oil, and thus simplify the withdrawal of unconverted oil from the process. With a conversion around 80% in the first stage and about 20-40% recycle around the second stage, the second stage will be less than half the size of the first stage, and with a conversion around 80% in the second stage less than 5-10% of the feed stream will be in the heavy fractions from second stage, from which an unconverted oil will have to be separated, in order to avoid recycle of HPNA. The yield performance of the hydrocracker can be improved by operating at lower first stage conversion and higher recycle rates in the second stage. In such case the present disclosure can still provide either lower purge rates or lower HPNA concentrations in the recycle oil stream compared to conventional hydrocracker configurations.

By operating the final separation step at a temperature above the bubble point of the liquid to be separated, the fraction of product which is released from the fraction containing HPNA is increased, which means that the amount of heavy non-HPNA product withdrawn with the unconverted oil is reduced.

In the present disclosure, the final separation step may be a stripper or a fractionator. A stand alone stripper tower may be attached to an existing fractionation tower and requires only simple standard countercurrent trays. A stripping section can also be integrated within a fractionator and thereby save the cost a separate stand alone stripping tower, but requiring the use of a more complex divided wall tray configuration.

The process will typically employ a high pressure/high temperature separator and a low pressure/high temperature gas/liquid separator in cascade. If such a setup is operated at high temperature, the requirement for heating upstream the final separation step is reduced.

Figure 1:
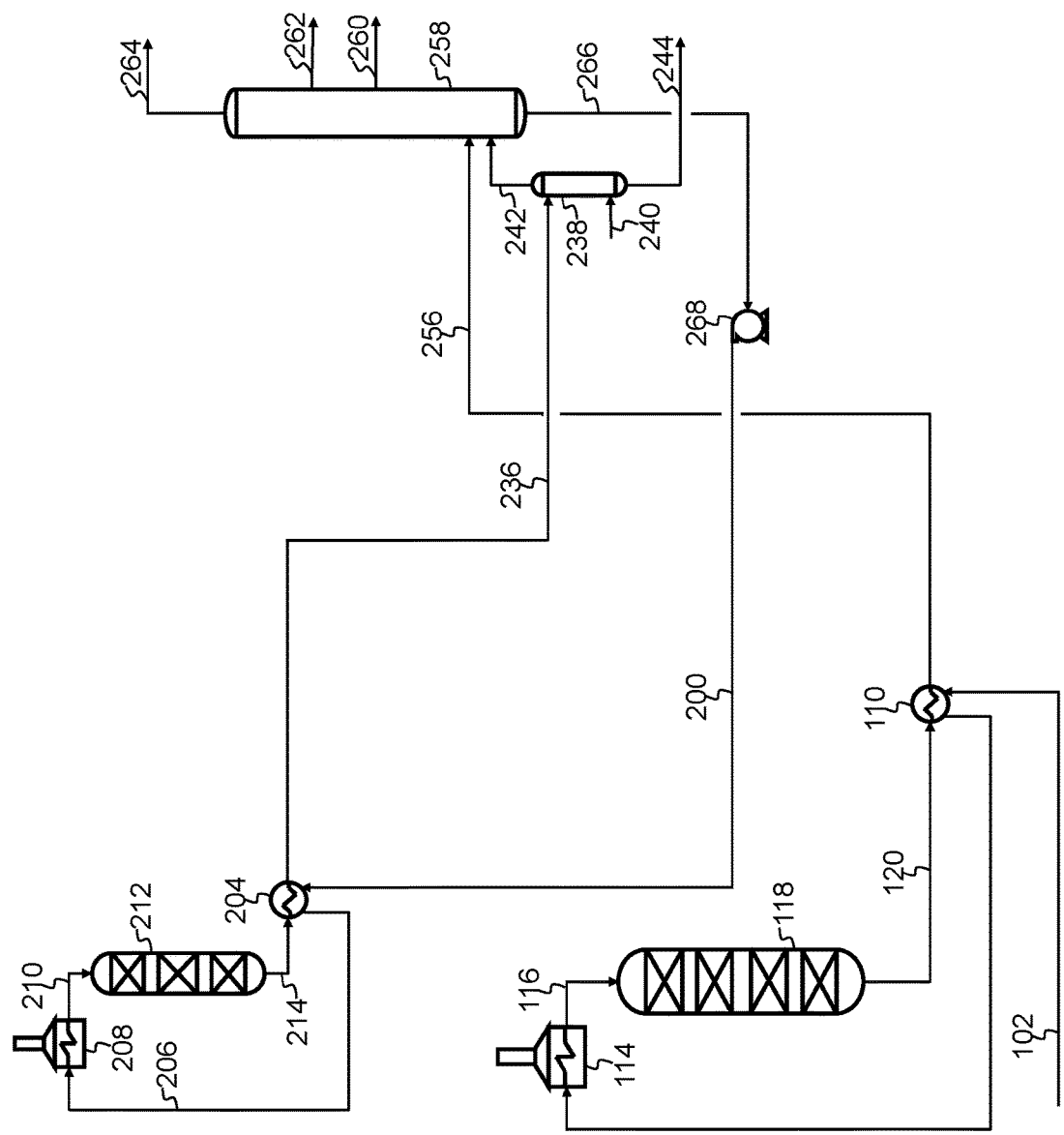
FIG. 1 shows a two stage hydrocracking process according to the present disclosure, in a simplified process diagram.

102 hydrocarbonaceous feed
104 make-up hydrogen
106 feed stream
108 first stage feed
110 heat exchanger
114 fired heater
116 hot stream for hydrocracking
118 first stage hydrocracking reactor
120 first stage hydrocracked product
124 high pressure hot separator feed
126 high pressure hot separator
128 hot vapor stream
130 cooler
132 cold separator feed
134 high pressure cold separator
136 cold vapor stream
138 cold liquid product
140 hot liquid stream
142 low pressure hot separator
144 hot low pressure vapor stream
146 combined hot low pressure vapor stream
148 cooler
150 combined cooled low pressure vapor stream
152 low pressure cold separator feed stream
154 hot low pressure liquid stream
156 low pressure cold separator
158 medium pressure gas
160 cold liquid stream
162 stripper feed stream
164 recycle compressor
166 pressurized recycle gas
168 second stage recycle gas
170 first stage recycle gas
172 cooled hydrocracked product
200 recycle feed stream
202 second stage feed stream
204 heat exchanger
206 preheated second stage feed stream
208 fired heater
210 second stage feed stream
212 second stage hydrocracking reactor
214 second hydrocracked product
216 cooled second hydrocracked product
218 high pressure hot separator
220 hot vapor stream 222 high pressure liquid product
224 low pressure hot separator
226 second stage hot low pressure vapor stream
228 low pressure liquid product
230 first medium pressure stripper
232 medium pressure steam
234 second stage stripper feed stream
236 feed stream
237 heavy fractionator feed stream
238 low pressure stripper
239 low pressure stripper feed stream
240 low pressure steam
241 net bottoms stream
242 stripper vapor
243 recycled stripped liquid
244 unconverted stripped liquid
245 stripper recycle portion
246 medium pressure stripper
248 medium pressure steam
250 low pressure gas
252 stripped liquid
254 fired heater
256 fractionator feed stream
258 fractionator
260 diesel
262 kerosene
264 naphtha
266 bottom fraction
267 heat exchanger
268 recycle oil pump
270 recycle oil stream
272 bottom fraction for stripping In FIG. 1 a general embodiment of the present process is shown in an illustration omitting hydrogen and gas streams for simplicity as these streams are well known to the skilled person, and may be implemented in a variety of ways. In the first stage, a hydrocarbonaceous feed 102 is preheated in one or both of a heat exchanger 110 and a fired heater 114 which, dependent on the specific circumstances, may be replaced by appropriate heat exchange with a process stream or other heating means. The resulting hot stream for hydrocracking 116 is directed to the first stage hydrocracking reactor 118, in which a first stage hydrocracked product 120 is formed. The first stage hydrocracked product 120 is cooled in heat exchanger 110 and directed to a first separation section, where it, typically by a traditional cascade of separators (not shown here), is separated into one or more vapor streams (not shown here) and a fractionator feed stream 256. In the second stage a bottom fraction 266 from a fractionator 258 is driven by a recycle oil pump 268 as a recycle feed stream 200. A hydrogen rich gas typically a recycle gas is added (not shown here) and the recycle feed stream 200 is preheated in by heat exchange with the second hydrocracked product 214 in heat exchanger 204 forming a preheated second stage feed stream 206, further heated e.g. in a fired heater 208 and directed as second stage feed stream 210 to the second stage hydrocracking reactor 212. The second hydrocracked product 214 is cooled in heat exchanger 204 and directed to a second separation section typically comprising a cascade of separators for separation of gases (not shown here) where the cooled second hydrocracked product is directed as a feed stream 236 to a low pressure stripper 238, receiving low pressure steam 240. The stripper vapor 242 from the low pressure stripper 238 is directed as a feed to a fractionator 258 and the unconverted stripped liquid 244 from the low pressure stripper 238 is directed to purge as unconverted oil. The fractionator 258 receives the stripper vapor 242 and the fractionator feed stream 256 in two streams as shown or in a single combined stream and separates it into products such as diesel 260, kerosene 262 and naphtha 264 as well as a bottom fraction 266. By this process all feed is passed to the first stage hydrocracking reactor 118, which operates as a once-through reactor. The second stage hydrocracking reactor 212 operates in a recycle loop, but the stripping of the second stage product in the stripper 238 ensures efficient removal of the heaviest fractions, such that formed HPNA molecules are largely removed from the process unit prior to combining with the bottom fraction 266.

Figure 2:
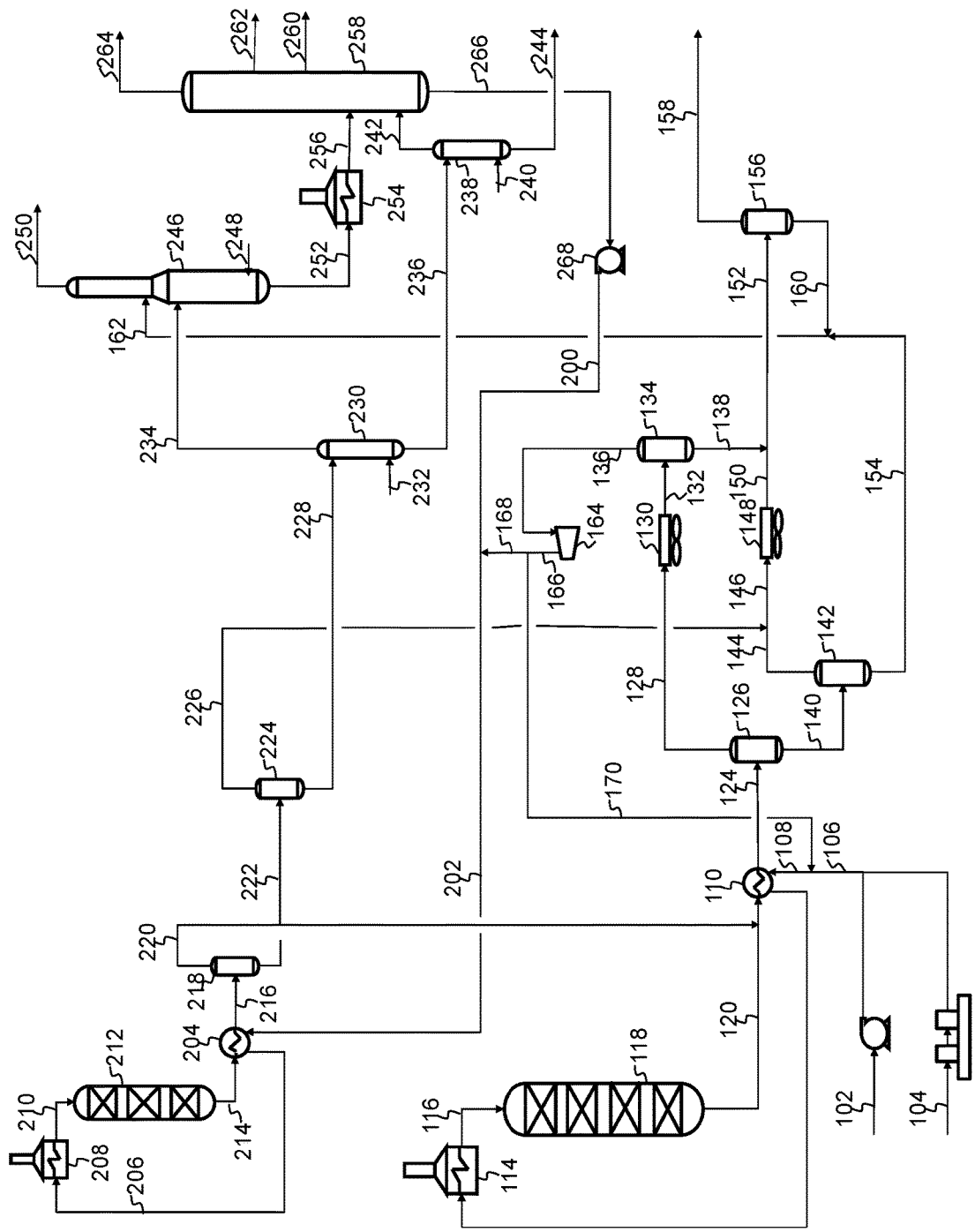
FIG. 2 shows a two stage hydrocracking process according to the present disclosure.

In FIG. 2, a similar general embodiment of the present process is shown, with more equipment and details including the hydrogen rich gas flows and separators not shown in FIG. 1a.

In the first stage, a hydrocarbonaceous feed 102 and make-up hydrogen 104 is combined into a feed stream 106, to which a first stage recycle gas 170 is added. The resulting first stage feed 108 is preheated in one or more of a heat exchanger 110 and a fired heater 114 which, dependent on the specific circumstances, may be replaced by appropriate heat exchange with a process stream or other heating means. The resulting hot stream for hydrocracking 116 is directed to the first stage hydrocracking reactor 118, in which a first stage hydrocracked product 120 is formed. The first stage hydrocracked product 120 is combined with a second stage hot vapor stream 220, cooled by the first stage feed 108 in heat exchanger 110 and the cooled first stage hydrocracked product is directed as a high pressure hot separator feed 124 into a first stage high pressure hot separator 126, providing a first stage hot vapor stream 128 and a first stage hot liquid stream 140. The first stage hot vapor stream is cooled in cooler 130 and directed as a cold separator feed 132 to a high pressure cold separator 134, providing a first stage cold vapor stream 136 and a first stage cold liquid product 138. The first stage hot liquid stream 140 is depressurized and directed to a first stage low pressure hot separator 142, providing a first stage hot low pressure vapor stream 144 and a first stage hot low pressure liquid stream 154. The first stage hot low pressure vapor stream 144 is combined with a second stage hot low pressure vapor stream 226 into a combined hot low pressure vapor stream 146, which is cooled in cooler 148. The cooled low pressure vapor stream 150 is combined with the first stage cold liquid product 138, forming a low pressure cold separator feed stream 152 which is directed to a low pressure cold separator 156, providing a medium pressure gas 158 and a cold liquid stream 160. The cold liquid stream 160 is combined with the first stage hot low pressure liquid stream 154 forming a stripper feed stream 162. The first stage cold vapor stream 136 is directed to a recycle compressor 164, providing a pressurized recycle gas 166, which is split into a first stage recycle gas 170 and a second stage recycle gas 168.

A bottom fraction 266 from a fractionator 258 is directed to a recycle oil pump 268 as a recycle feed stream 200, combined with the second stage recycle gas 168 and directed as the second stage feed stream 202. The second stage feed stream 202 is preheated by heat exchange with the second hydrocracked product 214 in heat exchanger 204 forming a preheated second stage feed stream 206, further heated e.g. in a fired heater 208 and directed as second stage feed stream 210 to the second stage hydrocracking reactor 212. The second hydrocracked product 214 is cooled in heat exchanger 204. The cooled second hydrocracked product 216 is directed as a feed to a second separation section, comprising a high pressure hot separator 218, providing a hot vapor stream 220 which is directed to the first stage and a high pressure liquid product 222. The high pressure liquid product 222 is directed to a second stage low pressure hot separator 224, which provides a second stage hot low pressure vapor stream 226 which is directed to the first stage and a low pressure liquid product 228. The low pressure liquid product 228 is directed as feed to a first medium pressure stripper 230, receiving medium pressure steam 232 as a stripping medium. The vapor phase from the first medium pressure stripper 230 is directed as a second stage stripper feed stream 234 to a second medium pressure stripper 246. The stripped liquid from the first medium pressure stripper 230 is directed as feed stream 236 to a low pressure stripper 238, receiving low pressure steam 240. Additional heat may be supplied to the low pressure stripper 238 by means of heating the feed stream 236 or the low pressure stream 240 or by heating an amount of the unconverted stripped liquid 244 and recycling it (not shown) to feed the low pressure stripper 238 or a combination thereof. The stripper vapor 242 from the low pressure stripper 238 is directed as a feed to a fractionator 258 where it also provides the necessary stripping medium for the bottom of the fractionator tower and the unconverted stripped liquid 244 from the low pressure stripper 238 is directed to purge as unconverted oil. The second medium pressure stripper 246 receives a first stage stripper feed stream 162 and a second stage stripper feed stream 234 (illustrated as separate streams, but the streams may also be combined), as well as medium pressure steam 248. The vapor from the second medium pressure stripper is directed as a low pressure gas 250 and the stripped liquid 252 from the second medium pressure stripper is heated e.g. in a fired heater 254 and directed as a fractionator feed stream 256 to the fractionator 258. The fractionator 258 separates the fractionator feed stream 256 into products such as diesel 260, kerosene 262 and naphtha 264 as well as a bottom fraction 266. By this process all feed is passed to the first stage hydrocracking reactor 118, which operates as a once-through reactor. The second stage hydrocracking reactor 212 operates in a recycle loop, but the stripping of the second stage product in the strippers 230, and 238 ensures efficient removal of the heaviest fractions, such that formed HPNA molecules are largely removed from the process unit prior to combining with the bottom fraction 266.

In an additional embodiment an amount of the unconverted stripped liquid 244 may be combined with the bottom fraction 266 and recycled to increase the conversion of the UCO or an amount of the unconverted stripped liquid 244 may be combined with the hydrocarbonaceous feed 102 and thus recycled to the first stage hydrocracking reactor 118.

A further embodiment involves the physical configuration of the low pressure stripper 238, which may be integrated into the main product fractionation tower by means of a divided wall tray arrangement.

A further embodiment involves the recycle of an amount of unconverted stripped liquid 244 to the low pressure stripper 238 (or another means of separation in the similar position) in a stripper recycle stream, with the benefit of further removing light hydrocarbons from the unconverted stripped liquid 244. This embodiment may involve heating of the stripper recycle stream, e.g. by heat exchange with the bottom fraction 266. In yet a further embodiment such a stripper recycle stream may be combined with steam and directed to the bottom of the stripper column, optionally after being heated. This will have the benefit of efficient heating of the stripper recycle stream In further embodiments the stripping medium 232, 240 and 248 may not be steam but a gas stream, such as hydrogen or fuel gas.

Figure 3:
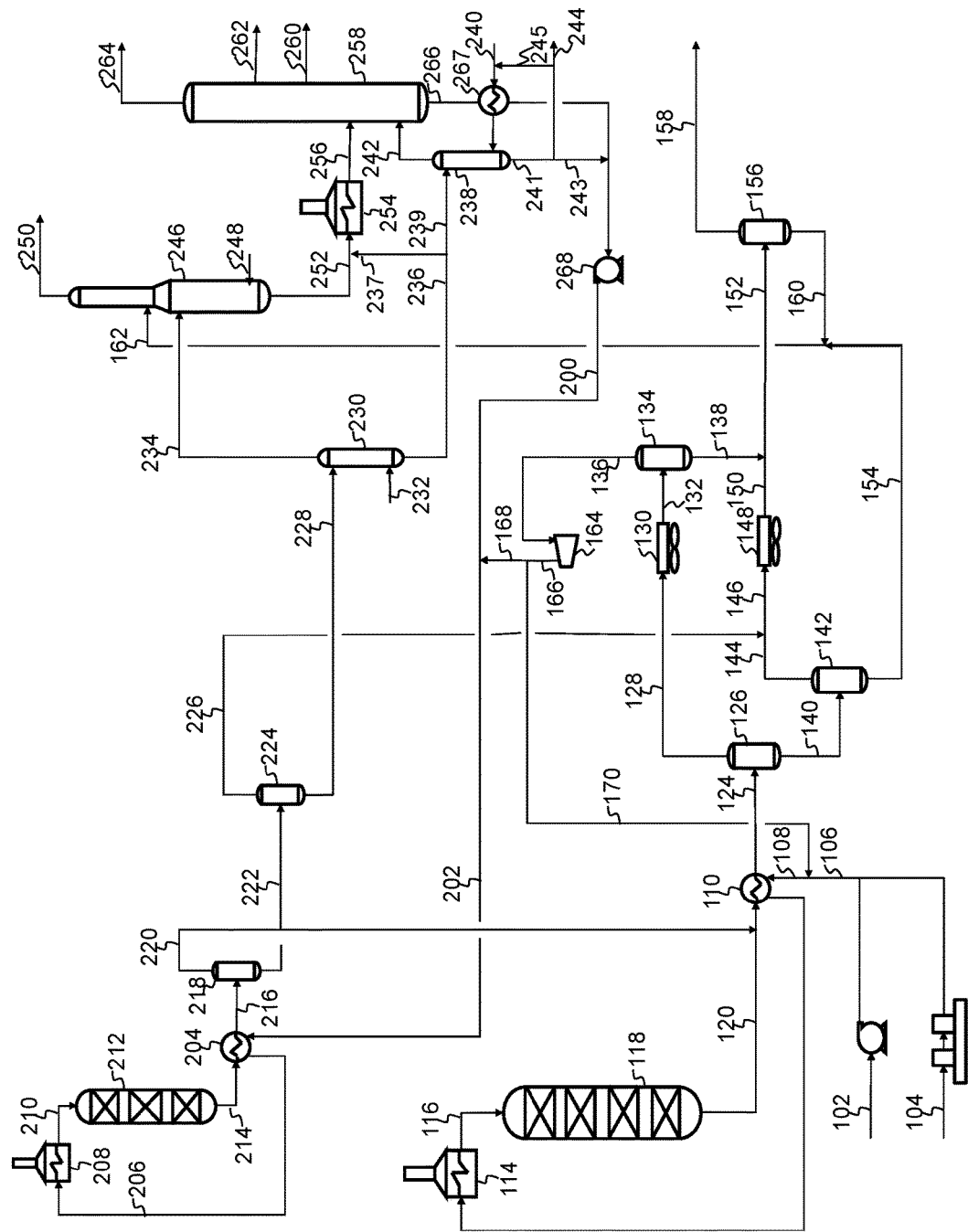
FIG. 3 shows a two stage hydrocracking process according to the present disclosure.

In FIG. 3, a further embodiment of the present process is shown.

In the first stage, a hydrocarbonaceous feed 102 and make-up hydrogen 104 is combined into a feed stream 106, to which a first stage recycle gas 170 is added. The resulting first stage feed 108 is preheated in one or more of a heat exchanger 110 and a fired heater 114 which, dependent on the specific circumstances, may be replaced by appropriate heat exchange with a process stream or other heating means. The resulting hot stream for hydrocracking 116 is directed to the first stage hydrocracking reactor 118, in which a first stage hydrocracked product 120 is formed. The first stage hydrocracked product 120 is combined with a second stage hot vapor stream 220, cooled by the first stage feed 108 in heat exchanger 110 and the cooled first stage hydrocracked product is directed as a high pressure hot separator feed 124 into a first stage high pressure hot separator 126, providing a first stage hot vapor stream 128 and a first stage hot liquid stream 140. The first stage hot vapor stream is cooled in cooler 130 and directed as a cold separator feed 132 to a high pressure cold separator 134, providing a first stage cold vapor stream 136 and a first stage cold liquid product 138. The first stage hot liquid stream 140 is depressurized and directed to a first stage low pressure hot separator 142, providing a first stage hot low pressure vapor stream 144 and a first stage hot low pressure liquid stream 154. The first stage hot low pressure vapor stream 144 is combined with a second stage hot low pressure vapor stream 226 into a combined hot low pressure vapor stream 146, which is cooled in cooler 148. The cooled low pressure vapor stream 150 is combined with the first stage cold liquid product 138, forming a low pressure cold separator feed stream 152 which is directed to a low pressure cold separator 156, providing a medium pressure gas 158 and a cold liquid stream 160. The cold liquid stream 160 is combined with the first stage hot low pressure liquid stream 154 forming a stripper feed stream 162. The first stage cold vapor stream 136 is directed to a recycle compressor 164, providing a pressurized recycle gas 166, which is split into a first stage recycle gas 170 and a second stage recycle gas 168.

A bottom fraction 266 from a fractionator 258 is directed to a recycle oil pump 268 as a recycle feed stream 200, combined with the second stage recycle gas 168 and directed as the second stage feed stream 202. The second stage feed stream 202 is preheated by heat exchange with the second hydrocracked product 214 in heat exchanger 204 forming a preheated second stage feed stream 206, further heated e.g. in a fired heater 208 and directed as second stage feed stream 210 to the second stage hydrocracking reactor 212. The second hydrocracked product 214 is cooled in heat exchanger 204. The cooled second hydrocracked product 216 is directed as a feed to a second separation section, comprising a high pressure hot separator 218, providing a hot vapor stream 220 which is directed to the first stage and a high pressure liquid product 222. The high pressure liquid product 222 is directed to a second stage low pressure hot separator 224, which provides a second stage hot low pressure vapor stream 226 which is directed to the first stage and a low pressure liquid product 228. The low pressure liquid product 228 is directed as feed to a first medium pressure stripper 230, receiving medium pressure steam 232 as a stripping medium. The vapor phase from the first medium pressure stripper 230 is directed as a second stage stripper feed stream 234 to a second medium pressure stripper 246. The stripped liquid from the first medium pressure stripper 230 is directed as stream 236 which is split in a heavy fractionator feed stream 237 and a low pressure stripper feed stream 239. The flow of the heavy fractionator feed stream 237 is regulated for the purpose of controlling the net bottoms flow as stream 241 from the low pressure stripper 238. The low pressure stripper feed stream 239 is directed to a low pressure stripper 238 which also receives low pressure steam 240. The unconverted stripped liquid 241 from the low pressure stripper 238 is split in a stripper recycle portion 245, a portion 244 directed to purge as unconverted oil and a portion 243 combined with the fractionator bottoms stream 266 directed as recycle to the second stage hydrocracking reactor 212. Additional heat is supplied to the low pressure stripper 238 by combining the stripper recycle portion 245 with stripping medium 240 and directing this stream to heat exchanger 267, receiving heat from the fractionator bottoms stream 266, before directing this heated stream to feed the low pressure stripper 238. The stripper vapor 242 from the low pressure stripper 238 is directed as a feed to a fractionator 258 where it also provides the necessary stripping medium for the bottom of the fractionator tower. The second medium pressure stripper 246 receives a first stage stripper feed stream 162 and a second stage stripper feed stream 234 (illustrated as separate streams, but the streams may also be combined), as well as medium pressure steam 248. The vapor from the second medium pressure stripper is directed as a low pressure gas 250 and the stripped liquid 252 from the second medium pressure stripper is combined with the heavy fractionator feedstream 237 and heated e.g. in a fired heater 254 and directed as a fractionator feed stream 256 to the fractionator 258. The fractionator 258 separates the fractionator feed stream 256 into products such as diesel 260, kerosene 262 and naphtha 264 as well as a bottom fraction 266. By this process all feed is passed to the first stage hydrocracking reactor 118, which operates as a once-through reactor. The second stage hydrocracking reactor 212 operates in a recycle loop, but the stripping of the second stage product in the strippers 230, and 238 ensures efficient removal of the heaviest fractions, such that formed HPNA molecules are largely removed from the process unit prior to combining with the bottom fraction 266.

As it will be clear to the skilled person, alternative embodiments in which elements of FIG. 1, FIG. 2 and FIG. 3 are combined individually are also possible. For instance the low pressure stripper 238 may be replaced with a fractionator, and only one or two of the features of controlling the stripped liquid flow by stream 237, recycling a portion of the stripped liquid 243 and providing heat to the low pressure stripper by heating steam and recycle in heat exchanger 267 may be implemented.

Figure 4:
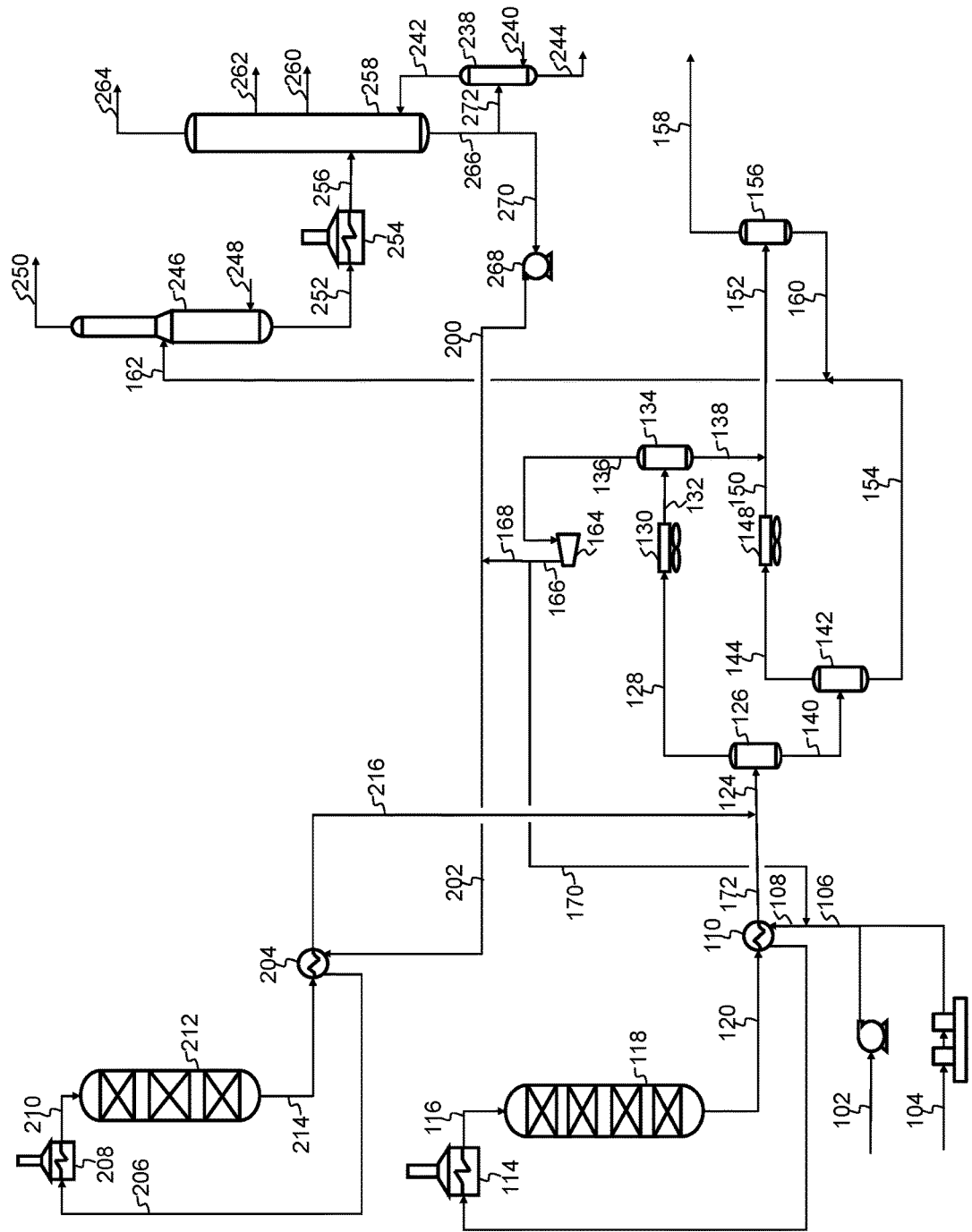
FIG. 4 shows a two stage hydrocracking process according to the prior art.

In FIG. 4, a process according to the prior art is shown. In the first stage, a hydrocarbonaceous feed 102 and make-up hydrogen 104 is combined into a feed stream 106, to which a first stage recycle gas 170 is added. The resulting first stage feed 108 is preheated in a heat exchanger 110 and directed to be further preheated, here in a fired heater 114 which dependent on the specific circumstances may be replaced by appropriate heat exchange with a process stream or other heating means. The resulting hot stream for hydrocracking 116 is directed to the first stage hydrocracking reactor 118, in which a first stage hydrocracked product 120 is formed. The first stage hydrocracked product 120 is cooled by the first stage feed 108 in heat exchanger 110 and the cooled hydrocracked product 172 is combined with a cooled second hydrocracked product 216 and directed to a separation section, where it forms a high pressure hot separator feed 124 and is further directed to a high pressure hot separator 126, providing a hot vapor stream 128 and a hot liquid stream 140. The hot vapor stream 128 is cooled in cooler 130 and directed as a cold separator feed 132 to a high pressure cold separator 134, providing a cold vapor stream 136 and a cold liquid product 138. The hot liquid stream 140 is depressurized and directed to a low pressure hot separator 142, providing a hot low pressure vapor stream 144 and a hot low pressure liquid stream 154. The hot low pressure vapor stream 144 is cooled in cooler 148. The cooled low pressure vapor stream 150 is combined with the cold liquid product 138, forming a low pressure cold separator feed stream 152 which is directed to a low pressure cold separator 156, providing a medium pressure gas 158 and a cold liquid stream 160. The cold liquid stream 160 is combined with the hot low pressure liquid stream 154 forming a stripper feed stream 162. The cold vapor stream 136 is directed to a recycle compressor 164, providing a pressurized recycle gas 166, which is split into a first stage recycle gas 170 and a second stage recycle gas 168.

A recycled oil stream 270 is directed to a recycle oil pump 268 as a recycle feed stream 200, combined with the second stage recycle gas 168 and directed as the second stage feed stream 202 which is preheated in by heat exchange with the second hydrocracked product 214 in heat exchanger 204 forming a preheated second stage feed stream 206, further heated e.g. in a fired heater 208 and directed as second stage feed stream 210 to the second stage hydrocracking reactor 212. The second hydrocracked product 214 is cooled in heat exchanger 204. The cooled second hydrocracked product 216 is directed to be combined with the cooled first hydrocracked product 172. A medium pressure stripper 246 receives the stripper feed stream 162, as well as medium pressure steam 248. The vapor from the medium pressure stripper is directed as a low pressure gas 250 and the stripped liquid 252 from the medium pressure stripper is heated e.g. in a fired heater 254 and directed as a fractionator feed stream 256 to the fractionator 258. The fractionator 258 separates the fractionator feed stream 256 into products such as diesel 260, kerosene 262 and naphtha 264 as well as a bottom fraction 266. The bottom fraction is split in the recycle oil stream 270 and a bottom fraction for stripping 272, directed as input to a low pressure stripper 238, receiving low pressure steam 240. The stripper vapor 242 from the low pressure stripper 238 is directed as a feed to a fractionator 258 and the unconverted stripped liquid 244 from the low pressure stripper 238 is directed to purge as unconverted oil. Compared to the present disclosure, the heaviest HPNA produced by reaction from both hydrocracking stages are fully mixed into the recycle oil stream 270 resulting in higher HPNA concentrations and poorer performance. This setup has fewer equipment items as a high pressure hot separator 218, a low pressure hot separator 224 and a medium pressure stripper 230 are avoided, but since the overall separation efficiency is poorer the yield loss through purge of unconverted stripped liquid 244 is higher.

EXAMPLES

A process according to the present disclosure of FIG. 1 and FIG. 2 has been evaluated against a process according to the prior art as illustrated in FIG. 3, using a combination of data derived from pilot scale experiments and process simulation. Distinct from the present disclosure, a conventional two stage hydrocracking configuration according to the prior art as shown in FIG. 3, combines the products from both reaction stages into a single stream which is sent to the product recovery section of the plant. That is, stream 124 of FIG. 3 comprises the streams 120 and 214 from the first and second stage reactors, which are cooled and combined into a single stream 124 feeding the high pressure hot separator vessel 126. Following a series of separation steps, the combined product is sent to the product stripper 246 and then to the product fractionator 258. A slip stream of the fractionator bottoms fraction 266, which is a combination of recycle oil produced in both the first and second stage reactors, is stripped in a side column attached to the bottom of the fractionator to concentrate HPNA in an unconverted oil purge stream 244.

In order to compare the performance of both the conventional configuration (FIG. 3) and the present disclosure as described in FIG. 2, a pilot plant test was first run to determine the net yield of HPNA from a two stage hydrocracking process. Simulations of the separation and stripping steps were then performed to determine the steady state concentration of HPNA in the respective recycle oil streams 200 for each configuration. The pilot plant test showed that under the specific conditions of the test, the yield of HPNA was 15 wppm relative to the feed, or 15 milligrams of total HPNA was produced per kilogram of feed processed. Both of the process configurations were simulated based on producing a net unconverted oil (UCO) purge yield of 1 wt % of the feed containing all of the net HPNA produced by reaction. The comparison of results is summarized in the tables below. In can be seen that in both cases, the concentration of HPNA molecules in the UCO purge stream is the same and accounts for the full yield of HPNA from the hydrocracking reaction stages. Cases were developed for recycle oil rates ranging from 25% to 60% of the fresh feed rate. In the case of the conventional configuration of FIG. 3, the temperature of the feed stream 272 to the top of the low pressure stripper 238 was in the range of 360-365° C. In the case of the present disclosure of FIG. 2, the temperature of the feed stream 236 to the top of the stripper tower 238 was in the range of 380-385° C. The same source and flow rate of stripping steam 240 to the bottom of the stripper tower 238 was used in both cases.

Example 1

The first example is the case where the conversion level in both the $1^{st}$ and $2^{nd}$ stage hydrocracking steps is fixed at about 80% of the reactor feed by appropriate selection of catalyst volume, space velocity and temperature. Under these conversion conditions, the $2^{nd}$ stage feed rate or recycle oil rate (stream 200) is about 25% of the feed to the $1^{st}$ stage (stream 102) which is designated as the Fresh Feed in Table 1. The results comparing the steady state concentration of HPNA in recycle oil at constant purge rate of unconverted oil are shown in Table 1.

TABLE 1

| Configuration | | Prior art FIG. 3 | Present Disclosure FIG. 1 |
|---|---|---|---|
| Conversion | Wt. % $1^{st}/2^{nd}$ stage feed | 80/80 | 80/80 |
| HPNA Yield | Wt ppm of Fresh Feed | 15 | 15 |
| UCO Purge | Wt. % of Fresh Feed | 1.0 | 1.0 |
| HPNA in Purge | Wt ppm of Purge | 1500 | 1500 |
| Recycle Oil | Wt. % of Fresh Feed | 25 | 25 |
| HPNA in Recycle Oil | Wt ppm of Recycle Oil | 675 | 95 |

In the configuration according to the prior art as well as in the present disclosure, the amount of HPNA purged from the unit is the same and the concentration of HPNA in the unconverted oil is the same. The difference in process configuration, however, leads to dramatically lower HPNA concentration in the recycle oil feed to the second stage.

Example 2

The second example is the case where the conversion level in both the $1^{st}$ and $2^{nd}$ stage hydrocracking steps is fixed at about 63% of the reactor feed, e.g. by appropriately reducing the catalyst volume, increasing the space velocity or increasing the temperature relative to Example 1. Compared to Example 1, operation under conditions of reduced conversion in each stage will result in better selectivity to the liquid products derived from hydrocracking. Under these conversion conditions, the $2^{nd}$ stage feed rate or recycle oil rate (stream 200) is about 60% of the feed to the $1^{st}$ stage (stream 102) which is designated the Fresh Feed. The results comparing the steady state concentration of HPNA in recycle oil at constant purge rate of unconverted oil are shown in Table 2.

TABLE 2

| Configuration | | Conventional FIG. 3 | Present Disclosure FIG. 1 |
|---|---|---|---|
| Conversion | Wt. % $1^{st}/2^{nd}$ stage feed | 63/63 | 63/63 |
| HPNA Yield | Wt ppm of Fresh Feed | 15 | 15 |
| UCO Purge | Wt. % of Fresh Feed | 1.0 | 1.0 |
| HPNA in Purge | Wt ppm of Purge | 1500 | 1500 |
| Recycle Oil | Wt. % of Feed | 60 | 60 |
| HPNA in Recycle Oil | Wt ppm of recycle oil | 595 | 290 |

As in Example 1, the concentration of HPNA in the recycle oil stream is substantially reduced in the new disclosure compared to a conventional design. The difference in concentration is less than seen in the first example as a consequence of the high UCO content present in the second stage reactor effluent and corresponding lower degree of vaporization in the stripping steps.

These results illustrate that the novel sequence of separation and stripping steps employed in the present disclosure, substantially reduces the steady state HPNA concentration within the hydrocracker recycle oil stream, from 675 wtppm down to 95 wtppm HPNA at a recycle oil rate of 25%. When the recycle oil rate is increased to 60% of feed, the new process scheme gives a reduction from 595 wtppm down to 290 wtppm HPNA. Therefore, over the practical range of recycle oil rates commonly utilized in hydrocracking two stage processes, the present disclosure produces a substantial reduction in the recycle of HPNA.

Since the high concentration of HPNA in the recycle oil is known to cause increased catalyst deactivation, this reduction in HPNA recycle can provide the following benefits to the hydrocracking process not currently achievable with known conventional configurations. The reduced concentration of HPNA results in lower catalyst deactivation rates, which gives longer operation cycles and improved yields from the process. Higher yields of HPNA can be tolerated and thereby allowing the hydrocracking process to be designed at lower pressure with a corresponding savings in capital and operating costs. Units originally designed for low conversion once-through operation can be revamped for higher conversion recycle operation while maintaining acceptable HPNA levels, Higher HPNA yields can also be tolerated from heavier, higher boiling and more aromatic feedstocks without the need for more expensive design conditions and for yield penalties associated with increased UCO purge rates. All of these results can lead to substantial economic benefits to the commercial user.

The invention claimed is:

1. A process for conversion of a hydrocarbon mixture of which at least 95% has a boiling point above 150° C. to a lower boiling hydrocarbon product comprising the steps of:
    directing said hydrocarbon mixture to contact a material catalytically active in hydrocracking under hydrocracking conditions to provide a first hydrocracked product;
    directing at least an amount of said first hydrocracked product and an amount of a converted hydrocracked product to a product separation step separating it into one or more products including the lower boiling hydrocarbon product and a bottom fraction comprising components from a stripper vapor obtained from a second separation step having a higher average boiling point than said one or more products;
    directing said bottom fraction to contact a second material catalytically active in hydrocracking under hydrocracking conditions to provide a second hydrocracked product;
    directing at least an amount of said second hydrocracked product as feed to the second separation step, separating said second hydrocracked product in at least two fractions, the stripper vapor comprising the converted hydrocracked product and an unconverted oil having a higher average boiling point than said bottom fraction; and
    withdrawing at least an amount of said unconverted oil as purge.

2. The process according to claim 1, wherein said product separation step comprises a separator, wherein said second separation step receives thermal energy from at least one heat source, the thermal energy heating at least one inlet stream to the separator or one internal stream of said second separation step to a temperature above the bubble point of said inlet stream or said internal stream.

3. The process according to claim 1, in which said second separation step involves gas/liquid separation in one or more steps, an optional intermediate separation step, and a final step of separation, said optional intermediate separation step, if present, receiving at least an amount of liquid from said gas/liquid separation steps and providing a heavy fraction of said liquid from said gas/liquid separation steps to said final step of separation, or if said intermediate separation step is not present, said final step of separation receiving at least a fraction of the liquid from said gas/liquid separation steps and wherein thermal energy is directed to an inlet stream to said final step of separation.

4. The process according to claim 3, in which said final step of separation is a stripping step receiving a liquid fraction, a stripping medium and optionally a recycle of liquid, and in which said thermal energy is directed to one or more of said liquid fraction, said stripping medium and said optional recycle of liquid.

5. The process according to claim 4, in which all steam involved in the operation of said product separation step is directed to said final step of separation, and in which said stripping medium is steam at pressure level consistent with the operation of said product separation step.

6. The process according to claim 4, in which said final step of separation is a fractionator receiving a liquid fraction, optionally a stream of steam and optionally a recycle of liquid, and in which said thermal energy is directed to one or more of said liquid fraction, said optional stream of steam and said optional recycle of liquid or in the form of reboiling the heavy bottoms.

7. The process according to claim 3, in which the feed temperature of the second hydrocracked product to the second separation step is at least 320° C.

8. The process according to claim 4, in which said final step of separation receives a stream having a mass flow less than 25% of the mass flow of the hydrocarbon mixture.

9. The process according to claim 1, in which said second separation step involves gas/liquid separation in one or more intermediate separation steps and a final step of separation, in which said one or more intermediate separation steps comprises receiving the liquid fraction from said gas/liquid separation steps and directing a light fraction to said product separation step and directing a heavy fraction to said final step of separation.

10. The process according to claim 1, in which at least 50% of said first hydrocracked product boils below the initial boiling point of said hydrocarbon mixture, and at least 50% of said second hydrocracked product boils below the initial boiling point of said bottom fraction.

11. The process according to claim 1, wherein the hydrocracking conditions to provide the first hydrocracked product comprise a pressure below 160 bar.

12. The process according to claim 1, in which no stream of first hydrocracked product is directed to said second separation step without having first contacted the second material catalytically active in hydrocracking.

13. The process according to claim 1, wherein stripping medium for the product separation step is directed to a stripping step of the second separation step.

14. The process according to claim 13, wherein all the stripping medium for the product separation step is directed to the stripping step of the second separation step.

15. A hydrocracking process plant comprising:
    a first stage trickle bed hydrocracker having an inlet and an outlet,
    a second stage trickle bed hydrocracker having an inlet and an outlet,
    a product separation section having at least one inlet and at least a light fraction outlet and a heavy fraction outlet,
    a second separation section, said second separation section comprising a stripping section, the second separation section having an inlet and at least a stripping vapor outlet and a heavy fraction outlet,
    in which said first stage hydrocracker inlet is in fluid communication with a feed stream,
    and said first stage hydrocracker outlet is in fluid communication with the at least one inlet of said product separation section,
    in which said product separation section heavy fraction outlet is in fluid communication with the second hydrocracker inlet, and optionally via a common fractionator,
    the second hydrocracker outlet is in fluid communication with said second separation section inlet,
    said second separation section stripping vapor outlet is in fluid communication with the at least one inlet of said product separation section,
    and said second separation section heavy fraction outlet is in fluid communication with an unconverted oil purge line, wherein there is no fluid communication between said first stage hydrocracker outlet or said product separation section outlet and the second separation section inlet.

16. The hydrocracking process plant according to claim 15, in which said second separation section comprises:
- a liquid/vapor separation section having an inlet, a vapor outlet and a liquid outlet, said liquid/vapor separation section optionally comprising a high pressure hot separator and a low pressure hot separator configured for a liquid outlet of said high pressure hot separator being in fluid communication with a feed stream inlet of said low pressure hot separator, and configured for a liquid outlet from said low pressure hot separator being in fluid communication with the second stage hydrocracker separation section liquid outlet, and
- the stripping section, said stripping section optionally comprising a first second stage separator selected from a stripper or a fractionator and a second second stage separator selected from a stripper or a fractionator, each having a feed stream inlet, a stripping vapor outlet and a liquid outlet and optionally a stripping medium inlet,
- wherein said first second stage separator inlet is in fluid communication with the liquid/vapor separation section liquid outlet and the first second stage separator optionally is configured to receive medium pressure steam as stripping medium,
- wherein the first second stage separator liquid outlet is in fluid communication with the feed stream inlet of the second second stage separator which optionally is configured to receive low pressure steam as stripping medium, and
- wherein the stripping vapor outlet of said first second stage separator is in fluid communication with a feed stream inlet of said product separation section and the stripping vapor outlet of said second second stage separator is in fluid communication with a feed stream inlet of said product separation section.

17. The hydrocracking process plant according to claim 16, in which at least one of the second stage separators is a stripper and is integrated into the product separation section by means of a divided wall tray arrangement.

18. A process for conversion of a hydrocarbon mixture of which at least 95% has a boiling point above 150° C. to a lower boiling hydrocarbon product comprising the steps of:
- directing said hydrocarbon mixture to contact a material catalytically active in hydrocracking under hydrocracking conditions to provide a first hydrocracked product;
- directing at least an amount of said first hydrocracked product and an amount of a converted hydrocracked product to a product separation step separating it into one or more products including the lower boiling hydrocarbon product and a recycle oil having a higher average boiling point than said one or more products;
- directing said recycle oil to contact a second material catalytically active in hydrocracking under hydrocracking conditions to provide a second hydrocracked product;
- directing at least an amount of said second hydrocracked product as feed to a second separation step, separating said second hydrocracked product in at least two fractions, the converted hydrocracked product and an unconverted oil having a higher average boiling point than said recycle oil; and
- withdrawing at least an amount of said unconverted oil as purge,
- wherein stripping medium for the product separation step is directed to a stripping step of the second separation step.

19. The process according to claim 18, wherein all the stripping medium for the product separation step is directed to the stripping step of the second separation step.

20. The process according to claim 18, wherein the stripping medium is at a pressure level consistent with the operation of said product separation step.

* * * * *